(12) United States Patent
Kang (10) Patent No.: US 9,174,376 B2
(45) Date of Patent: Nov. 3, 2015

(54) THIN FILM SHEET FABRICATION METHOD

(71) Applicant: Ho Kwan Kang, Seoul (KR)

(72) Inventor: Ho Kwan Kang, Seoul (KR)

(*) Notice: Subject to any disclaimer, the term of this patent is extended or adjusted under 35 U.S.C. 154(b) by 0 days.

(21) Appl. No.: 14/491,784

(22) Filed: Sep. 19, 2014

(65) Prior Publication Data

US 2015/0147420 A1 May 28, 2015

(30) Foreign Application Priority Data

Nov. 28, 2013 (KR) .................. 20-2013-0009821

(51) Int. Cl.
*B29C 47/88* (2006.01)
*B29C 47/00* (2006.01)
*B29C 47/08* (2006.01)
*B29C 47/90* (2006.01)
*B29C 47/92* (2006.01)
*B29K 83/00* (2006.01)

(52) U.S. Cl.
CPC ......... *B29C 47/0021* (2013.01); *B29C 47/0898* (2013.01); *B29C 47/884* (2013.01); *B29C 47/8845* (2013.01); *B29C 47/8875* (2013.01); *B29C 47/8895* (2013.01); *B29C 47/906* (2013.01); *B29C 47/92* (2013.01); *B29C 2947/92152* (2013.01); *B29C 2947/92438* (2013.01); *B29K 2083/005* (2013.01)

(58) Field of Classification Search
CPC  B29C 47/0021; B29C 47/08; B29C 47/0898; B29C 47/14; B29C 47/88; B29C 47/884; B29C 47/8845; B29C 47/8875; B29C 47/8895; B29C 47/906; B29C 47/907; B29C 47/92; B29C 2947/92152; B29C 2947/92438
See application file for complete search history.

(56) References Cited

U.S. PATENT DOCUMENTS

| 3,470,288 | A | * | 9/1969 | Dunnington et al. | ..... 264/178 R |
| 5,171,499 | A | * | 12/1992 | Cehelnik et al. | ............. 264/151 |
| 2013/0059023 | A1 | * | 3/2013 | Madeleine et al. | ............. 425/71 |
| 2013/0277880 | A1 | * | 10/2013 | Dubois et al. | ................. 264/165 |

FOREIGN PATENT DOCUMENTS

| KR | 20050028861 | 3/2005 |
| KR | 100821322 | 4/2008 |
| KR | 2010014488 | 2/2010 |

\* cited by examiner

*Primary Examiner* — Yogendra Gupta
*Assistant Examiner* — Joseph Leyson
(74) *Attorney, Agent, or Firm* — IPLA P.A.; James E. Bame (57) ABSTRACT

A thin film sheet manufacturing apparatus includes: an extruder; a cooling water tank; a dehydration tank; a dehydrator; and a winder for winding the thin film sheet passing the dehydrator, wherein the dehydrator includes: a support frame extending back and forth; a transferring roller; upper and lower air blowing pipes; an air blower connected to the upper and lower air blowing pipes to supply air of high pressure to the upper and lower air blowing pipes; and support rollers disposed in front of the upper and lower air blowing pipes for supporting the thin film sheet to be supplied between the upper and lower air blowing pipes.

6 Claims, 9 Drawing Sheets

THIN FILM SHEET FABRICATION METHOD

CROSS REFERENCE

This application claims foreign priority under Paris Convention to Korean Patent Application No. 20-2013-0009821, filed 28 Nov. 2013, with the Korean Intellectual Property Office.

BACKGROUND

The present invention relates to a thin film sheet manufacturing apparatus which can manufacture a thin film sheet of a thin synthetic resin or a thin rubber material.

Recently, high-powered electronic products of various kinds, such as smart phones, monitors of various kinds, and televisions, have been developed and widely used.

In the meantime, because such electronic products have been thinner and thinner, a thin film sheet of a thin synthetic resin material is inserted into the electronic product, so as to secure insulating properties between substrates or various components and to serve a buffering function to absorb impact applied to the substrates or various components.

In this instance, the thin film sheet is made of a silicon material which is flexible and elastic, and has a thickness of about 0.4 mm.

Meanwhile, because silicon which is used as a raw material for such a thin film sheet is not environment-friendly and tears easily, methods for manufacturing thin film sheets using synthetic resin of different kinds including rubber which is environment-friendly and has high strength have been studied, but the conventional thin film sheet manufacturing apparatus has a problem in that it is difficult to make rubber into a thin film sheet form.

Moreover, recently, because such electronic products have been thinner and thinner, consumers demand thin film sheet products which have a thickness of less than 0.4 mm, but the conventional thin film sheet manufacturing apparatus has a problem in that it cannot manufacture products of the thickness of less than 0.4 mm.

Therefore, a new method to solve the above problem is needed.

SUMMARY OF THE INVENTION

Accordingly, the present invention has been made to solve the above-mentioned problems occurring in the prior arts, and it is an object of the present invention to provide a thin film sheet manufacturing apparatus of a new structure which can manufacture a thin film sheet using rubber.

To accomplish the above object, according to the present invention, there is provided a thin film sheet manufacturing apparatus including: an extruder for extruding rubber or synthetic resin to mold a thin film sheet of a strip type; a cooling water tank of a box form of which upper side is opened, the cooling water tank storing cooling water therein to water-cool the thin film sheet extruded in the extruder; a dehydration tank of a barrel shape of which upper side is opened, the dehydration tank having a punched plate, which is arranged inside the dehydration tank and has a plurality of drain holes perforating the upper and lower sides thereof in order to remove moisture stained on the thin film sheet passed the cooling water tank; a dehydrator for second removing the moisture stained on the thin film sheet passing the dehydration tank; and a winder for winding the thin film sheet passing the dehydrator, wherein the dehydrator includes: a support frame extending back and forth; a transferring roller which is disposed on the support frame and driven by a driving motor to transfer the thin film sheet; upper and lower air blowing pipes which are disposed in front of the transferring roller to be located at the upper and lower sides of the thin film sheet and have air vents formed in the circumferential surface and opened toward the thin film sheet; an air blower connected to the upper and lower air blowing pipes to supply air of high pressure to the upper and lower air blowing pipes; and a plurality of support rollers which are disposed in front of the upper and lower air blowing pipes for supporting the thin film sheet to be supplied between the upper and lower air blowing pipes.

Moreover, an air vent of the upper air blowing pipe faces the lower side of the front and an air vent of the lower air blowing pipe faces the upper side.

Furthermore, the transferring roller is formed in a cylindrical shape having an inner space part and includes a plurality of suction holes formed in the circumferential surface thereof, and an intake device connected to one side of the transferring roller, such that the thin film sheet is adsorbed onto the circumferential surface of the transferring roller by vacuum pressure generated when the inside air of the transferring roller is discharged by the intake device.

Additionally, the thin film sheet manufacturing apparatus further includes an anti-spattering plate upwardly extending to be inclined from the rear side of the upper air blowing pipe toward the front.

In addition, the thin film sheet manufacturing apparatus further includes a hot air drier which is disposed to face the front to blow hot air toward the lower side of the thin film sheet passing the dehydrator.

Moreover, the thin film sheet manufacturing apparatus further includes a thickness adjusting unit disposed between the extruder and the cooling water tank to adjust a thickness of the thin film sheet extruded in the extruder, wherein the thickness adjusting unit includes: a support frame; a pair of press rollers which are disposed on the support frame to get in contact with the front and rear sides of the thin film sheet extruded from the extruder and are operated by a driving motor; an interval adjusting unit which is connected to the press rollers to adjust an interval between the press rollers; and an interval measuring unit for specifying the interval between the press rollers. Each of the press rollers is formed in a cylindrical shape having an inner space part, and cooling means is connected to the press rollers to cool the press rollers by circulating cooling water to the inside of the press rollers.

As described above, the thin film sheet manufacturing apparatus cools the thin film sheet extruded by the extruder using the cooling water tank, and winds the thin film sheet using the winder after dehydrating using the dehydration tank and the dehydrator, thereby manufacturing the thin film sheet using the rubber material.

In this instance, the dehydrator includes: a support frame extending back and forth; a transferring roller which is disposed on the support frame and driven by a driving motor to transfer the thin film sheet; upper and lower air blowing pipes which are disposed in front of the transferring roller to be located at the upper and lower sides of the thin film sheet and have air vents formed in the circumferential surface and opened toward the thin film sheet; an air blower connected to the upper and lower air blowing pipes to supply air of high pressure to the upper and lower air blowing pipes; and a plurality of support rollers which are disposed in front of the upper and lower air blowing pipes for supporting the thin film sheet to be supplied between the upper and lower air blowing pipes, thereby effectively removing moisture stained on the upper and lower sides of the thin film sheet by spraying air of high pressure to the upper and lower sides of the thin film sheet transferred to the rear by the transferring roller in a state where the thin film sheet is supported by the support rollers.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings.

FIGS. 1 to 11 illustrate a thin film sheet manufacturing apparatus according to a preferred embodiment of the present invention, showing how to manufacture a thin film sheet 1 which is made of a rubber material and is 2 mm in thickness.

In this instance, rubber for manufacturing the thin film sheet 1 is thermoplastic synthetic rubber which is made by mixing synthetic materials of various kinds to natural rubber.

Figure 1:
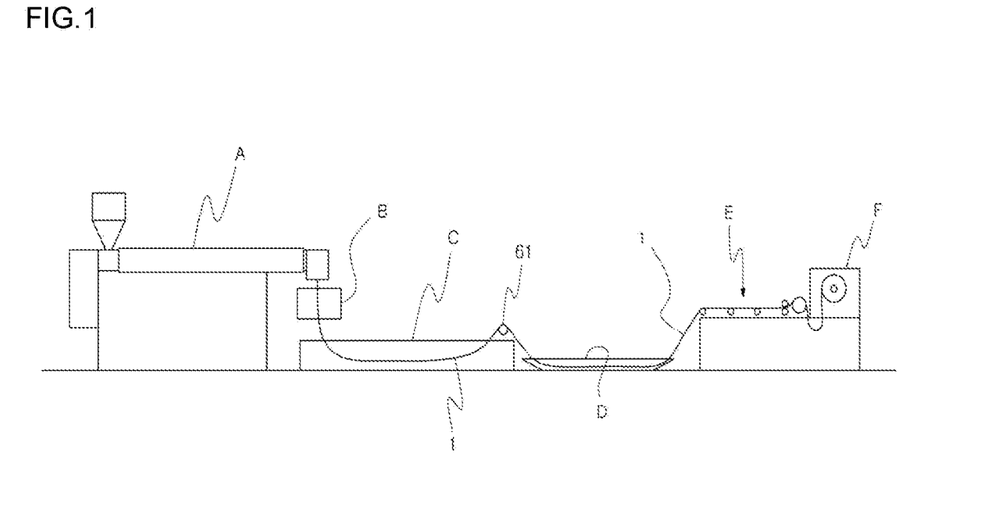
FIG. 1 is a configurative view showing a thin film sheet manufacturing apparatus according to a preferred embodiment of the present invention.

Moreover, as shown in FIG. 1, the thin film sheet manufacturing apparatus includes: an extruder (A) for molding a thin film sheet 1 of a strip type by extruding rubber; a thickness adjusting unit (B) for adjusting thickness of the thin film sheet 1 extruded in the extruder (A); a cooling water tank (C) for water-cooling the thin film sheet 1 which passes the thickness adjusting unit (B) after being extruded in the extruder (A); a dehydration tank (D) for removing moisture stained on the thin film sheet 1 passed the cooling water tank (C); a dehydrator (E) for second removing the moisture stained on the thin film sheet 1 passing the dehydration tank (D); and a winder (F) for winding the thin film sheet 1 passing the dehydrator (E).

Figure 2:
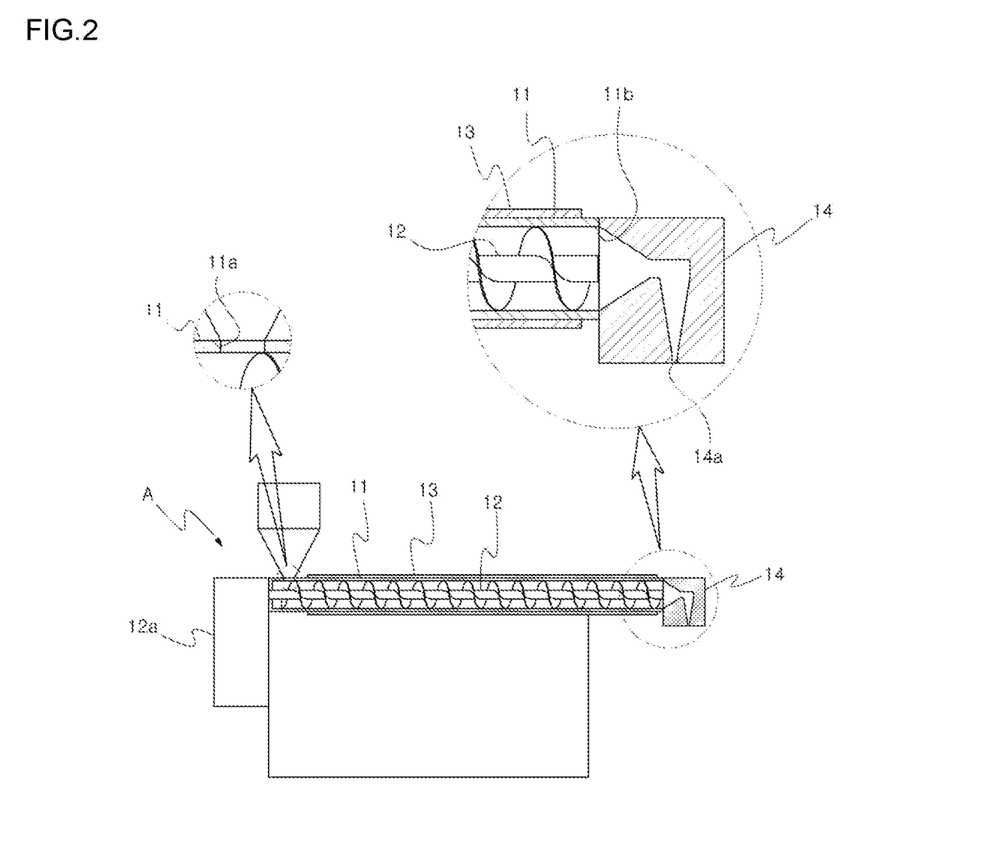
FIG. 2 is a side sectional view showing an extruder of the thin film sheet manufacturing apparatus.

In detail, as shown in FIG. 2, the extruder (A) includes: a cylinder 11 extending back and forth and having an inlet 11a and an outlet 11b which are respectively formed at the front and rear ends; an extruder screw 12 which is disposed inside the cylinder 11 and rotated by a driving motor 12a to pressurize and transfer rubber supplied to the inlet 11a to the front; a heater 13 which is disposed on the circumferential surface of the cylinder 11 to heat the rubber transferred to the front by the extruder screw 12; and a mold 14 which is disposed at the outlet 11b and has a molding hole 14a formed vertically for passing the rubber extruded to the outlet 11b by the extruder screw 12.

In this instance, the molding hole 14a is long in the lateral direction and has the anteroposterior width corresponding to the thickness of the thin film sheet 1, namely, the width of 0.2 mm.

Therefore, in a state where the heater 13 and the driving motor 12a are operated, when synthetic rubber, which is a raw material, is put into the inlet 11a, the rubber is pressurized and transferred to the front by the extruder screw 12 while being heated by the heater 13, is molded in the form of the thin film sheet 1 while passing through the molding hole 14a of the mold 14, and then, is discharged to the downside.

Figure 3:
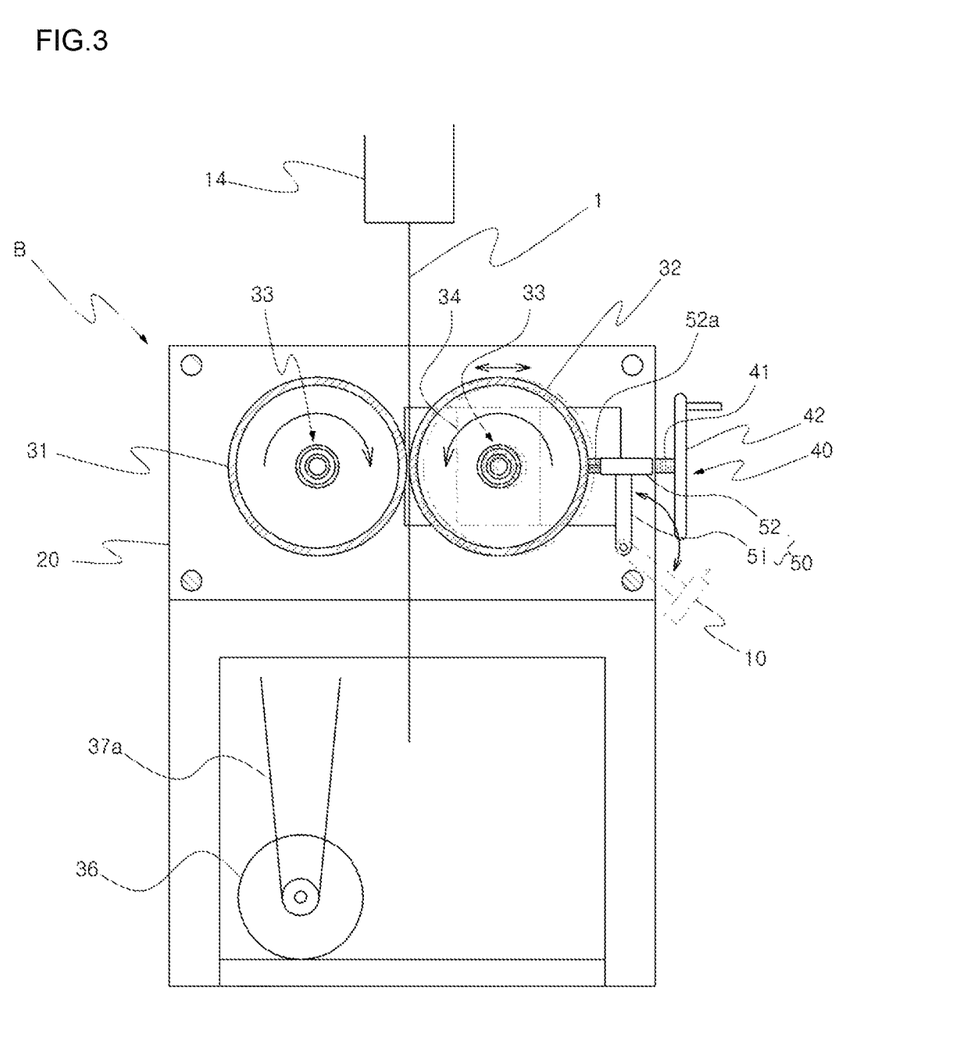
FIG. 3 is a side sectional view showing a thickness adjusting unit of the thin film sheet manufacturing apparatus.
Figure 4:
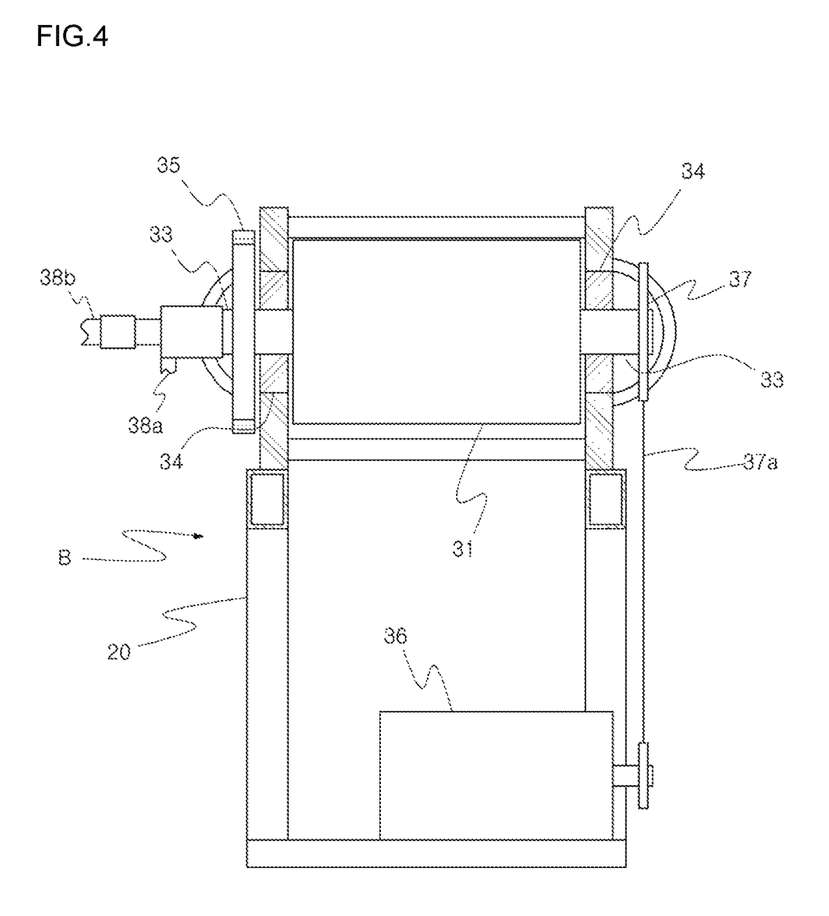
FIG. 4 is a rear side sectional view showing the thickness adjusting unit of the thin film sheet manufacturing apparatus.
Figure 5:
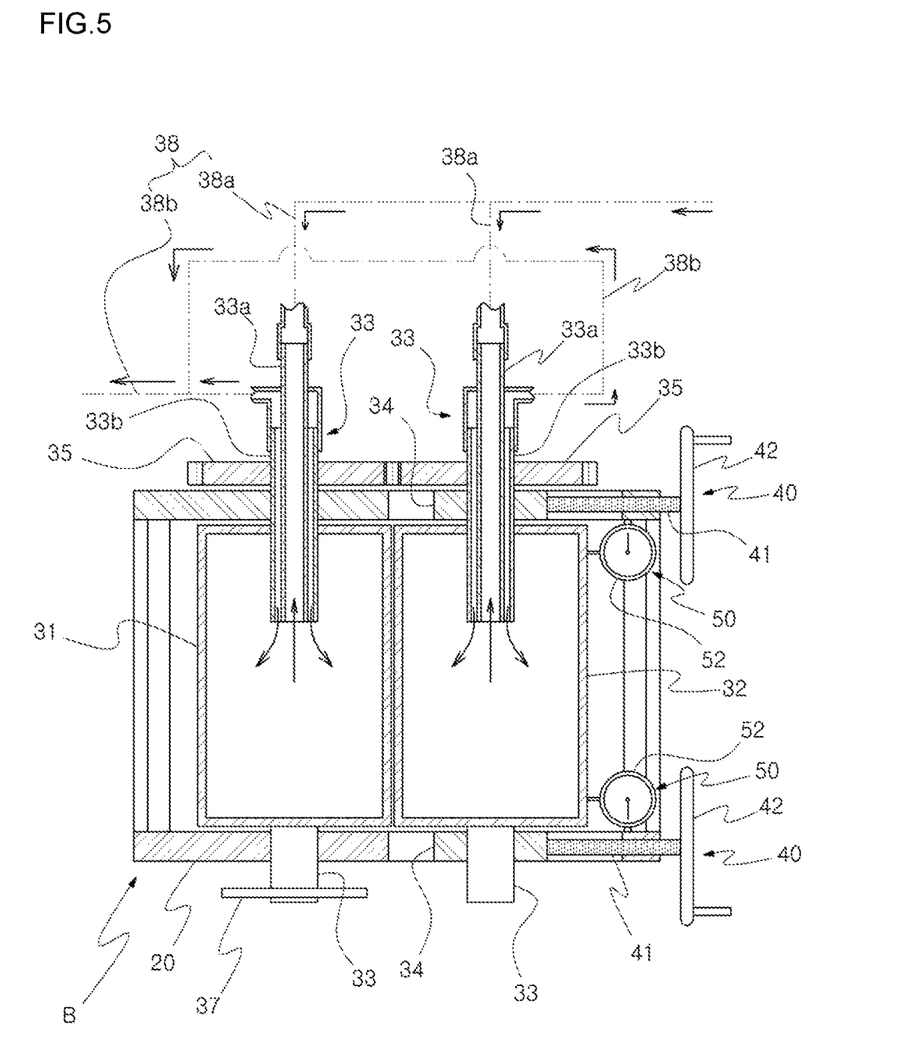
FIG. 5 is a plane sectional view showing the thickness adjusting unit of the thin film sheet manufacturing apparatus.

As shown in FIGS. 3 to 5, the thickness adjusting unit (B) includes a support frame 20, a pair of press rollers 31 and 32 which are disposed on the support frame 20 to get in contact with the front and rear sides of the thin film sheet 1 extruded from the extruder (A) and are operated by a driving motor 36; an interval adjusting unit 40 which is connected to the press rollers 31 and 32 to adjust an interval between the press rollers 31 and 32; and an interval measuring unit 50 for specifying the interval between the press rollers 31 and 32.

Each of the press rollers 31 and 32 is formed in a cylindrical shape which is long in the lateral direction and has an inner space part, and is rotatably joined to the support frame 20 by a rotary shaft 33 extending laterally from the central portion of both sides, and includes a fixed press roller 31 fixed to the support frame 20 and a variable press roller 32 joined to the support frame 20 to be able to slide back and forth.

In this instance, support blocks 34 which are joined to the support frame 20 to be able to slide back and forth are rotatably joined to both ends of the rotary shaft 33 disposed at the variable press roller 32.

Furthermore, a sprocket 37 which is connected to the driving motor 36 by a chain 37a is disposed at one end of the rotary shaft 33 of the fixed press roller 31, and a pair of gears 35 which are geared with each other are disposed at the other end of the rotary shaft 33 of the fixed press roller 31 and the variable press roller 32, such that the fixed press roller 31 and the variable press roller 32 are interlocked with each other to be rotated in the opposite direction to each other when the fixed press roller 31 is driven by the driving motor 36.

In this instance, the fixed press roller 31 and the variable press roller 32 are rotated in a direction that the proximate surface lowers.

Additionally, cooling means 38 is connected to the press roller 31 and 32 to cool the press rollers 31 and 32 by circulating cooling water to the inside of the press rollers 31 and 32.

For this, as shown in FIG. 5, the rotary shaft 33 at the side that the gear 35 is disposed from the press rollers 31 and 32 has outer support pipes 33a and 33b arranged to form a concentric axis, and the cooling means 38 includes a water supply pipe 38a connected to the inner support pipe 33a by a rotary coupler and a drain pipe 38b connected to the outer support pipe 33b by the rotary coupler.

In this instance, the water supply pipe 38a is connected to a water supply source which supplies cooling water of room temperature, such as tap water, such that cooling water introduced into the press rollers 31 and 32 through the inner support pipe 33a cools the press rollers 31 and 32 and is discharged to the outside through the drain pipe 38b.

The interval adjusting unit 40 includes: a pair of screw shafts 41 which are disposed to extend back and forth and screw-coupled to the support frame 20 and of which front end is rotatably connected to the support block 34; and handles 42 respectively disposed at base parts of the screw shafts 41.

Therefore, when a user rotates the screw shafts 41 in the forward and backward directions using the handles 42, as shown in FIG. 3, while the support block 34 and the variable press roller 32 are moved forwardly and backwardly, the interval between the fixed press roller 31 and the variable press roller 32 is adjusted.

The interval measuring unit 50 includes: a support bar 51 rotatably joined to the support frame 20 in the vertical direction; and a micrometer 52 which is disposed at the support bar 51 and has a contact pin 52*a* protruding to one side and getting in contact with the circumferential surface of the variable press roller 32.

Therefore, in a state where the circumferential surfaces of the fixed press roller 31 and the variable press roller 32 come into contact with each other by the interval adjusting unit 40 and the micrometer 52 of the interval measuring unit 50 comes into contact with the circumferential surface of the variable press roller 32, the user sets the micrometer 52 to zero, and then checks a measured value of the micrometer 52 while separating the circumferential surface of the variable press roller 32 from the circumferential surface of the fixed press roller 31 in order to accurately adjust the interval between the variable press roller 32 and the fixed press roller 31.

In addition, as described above, after the interval between the press rollers 31 and 32 is adjusted and the driving motor 36 is operated to cool the press rollers 31 and 32 using the cooling means 38, when the thin film sheet 1 extruded from the extruder (A) passes between the press rollers 31 and 32, the thickness of the thin film sheet 1 is adjusted to become the same thickness as the interval between the press rollers 31 and 32 while both sides of the thin film sheet 1 is compressed by the press rollers 31 and 32.

In this instance, because the press rollers 31 and 32 are cooled by the cooling means 38 while temperature of the thin film sheet 1 extruded from the extruder (A) is so high, the thin film sheet 1 is first cooled while passing between the press rollers 31 and 32.

Figure 6:
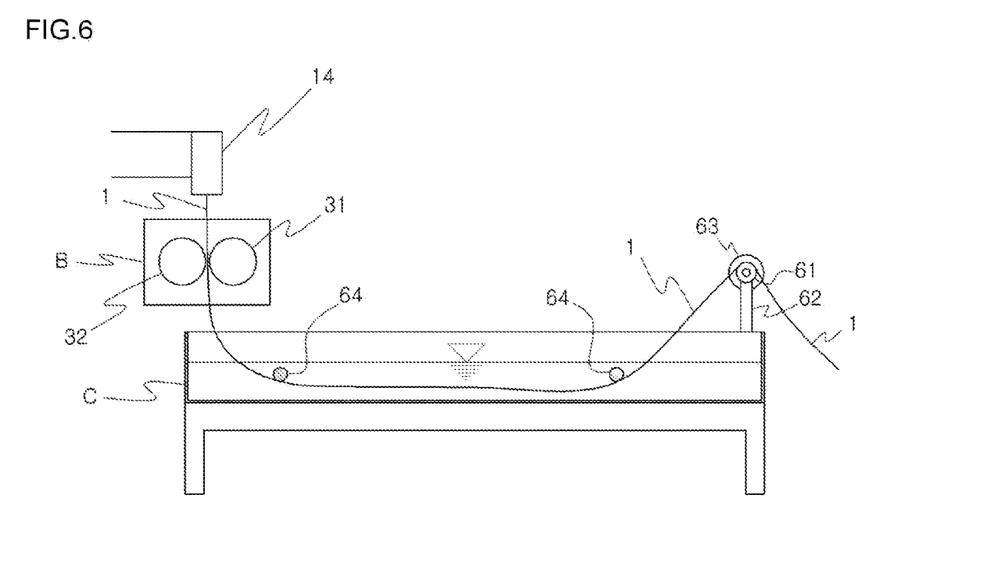
FIG. 6 is a side sectional view showing a cooling pool of the thin film sheet manufacturing apparatus.

As shown in FIG. 6, the cooling water tank (C) is formed in a box shape of which upper side is opened and stores cooling water therein, and the thin film sheet 1 passing the thickness adjusting unit (B) is cooled while passing the cooling water tank (C) in such a way as to be submerged in the cooling water.

In this instance, a driving roller 61 is disposed at the rear end part of the cooling water tank (C).

The driving roller 61 is formed in a bar shape of a silicon material, is rotatably joined to a supporter 62 disposed at one side of the rear end part of the cooling water tan (C), and the driving motor 63 is connected to one side of the driving roller 61.

Moreover, a pair of guide bars 64 are disposed inside the cooling water tank (C) and arranged to be submerged in water stored in the water tank, such that the thin film sheet 1 is submerged in water after passing the lower side of the guide bar 64.

Therefore, when the thin film sheet 1 passing the cooling water tank (C) is arranged to pass the lower side of the guide bar 64 and the upper side of the driving roller 61, the thin film sheet 1 is stuck on the circumferential surface of the driving roller 61 by moisture. When the driving motor 63 is operated, the driving roller 61 pulls the thin film sheet 1, such that the thin film sheet 1 is cooled while passing the cooling water contained in the cooling water tank (C) and is supplied to the dehydration tank (D).

Figure 7:
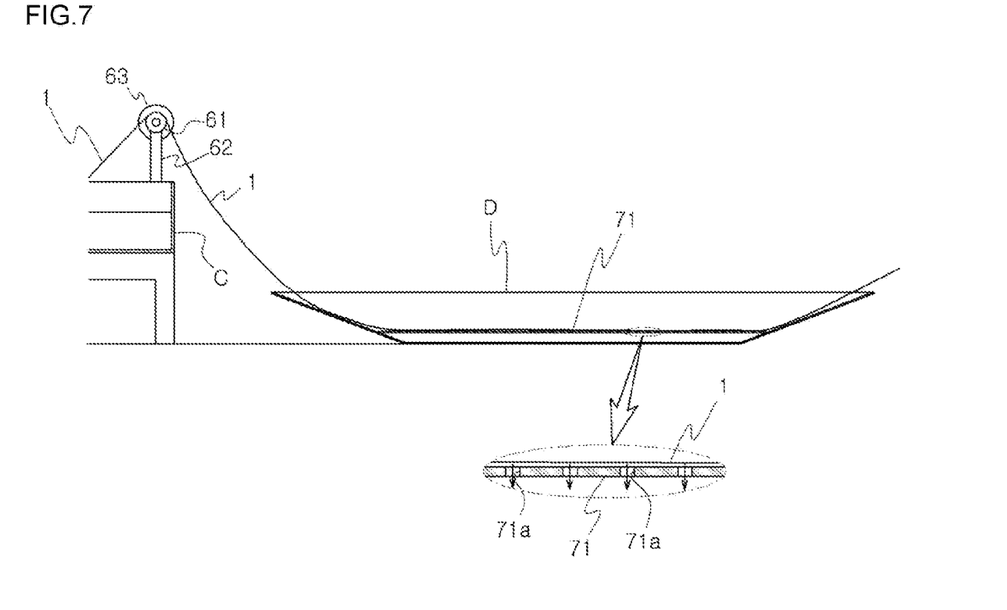
FIG. 7 is a side sectional view showing a dehydration tank of the thin film sheet manufacturing apparatus.

As shown in FIG. 7, the dehydration tank (D) is formed in a barrel shape of which upper side is opened, and has a punched plate 71, which is arranged inside the dehydration tank (D) and has a plurality of drain holes 71*a* perforating the upper and lower sides thereof, and a drain hole (not shown in the drawings) formed at one side thereof.

Therefore, while the thin film sheet 1 passing the cooling water tank (C) passes the upper side of the punched plate 71, moisture stained on the thin film sheet 1 is first removed.

As shown in FIGS. 8 to 12, the dehydrator (E) includes: a support frame 81 extending back and forth; a transferring roller 82 which is disposed on the support frame 81 and driven by a driving motor 82*a* to transfer the thin film sheet 1; upper and lower air blowing pipes 83 and 84 which are disposed in front of the transferring roller 82 to be located at the upper and lower sides of the thin film sheet 1 and have air vents 83*a* and 84*a* formed in the circumferential surface and opened toward the thin film sheet 1; an air blower 85 connected to the upper and lower air blowing pipes 83 and 84 to supply air of high pressure to the upper and lower air blowing pipes 83 and 84; and a plurality of support rollers 86 and 87 which are disposed in front of the upper and lower air blowing pipes 83 and 84 for supporting the thin film sheet 1 to be supplied between the upper and lower air blowing pipes 83 and 84.

Figure 8:
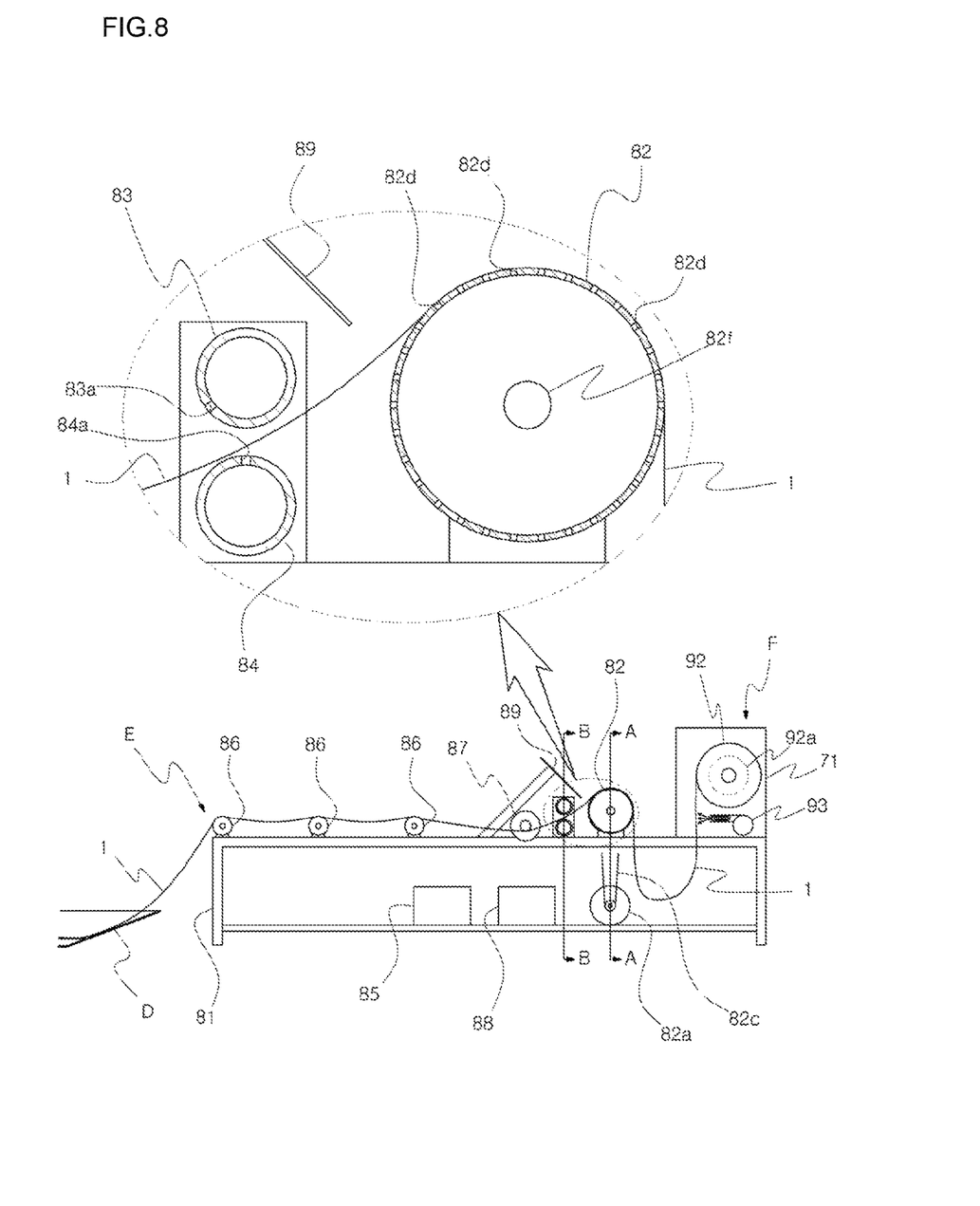
FIG. 8 is a side sectional view of a dehydrator of the thin film sheet manufacturing apparatus.

The transferring roller 82 has an inner space part, is formed in a cylindrical shape elongated in the lateral direction, and is connected to the driving motor 82*a* through a sprocket 82*b* and a chain 82*c* joined to a rotary shaft 82*f*.

Figure 9:
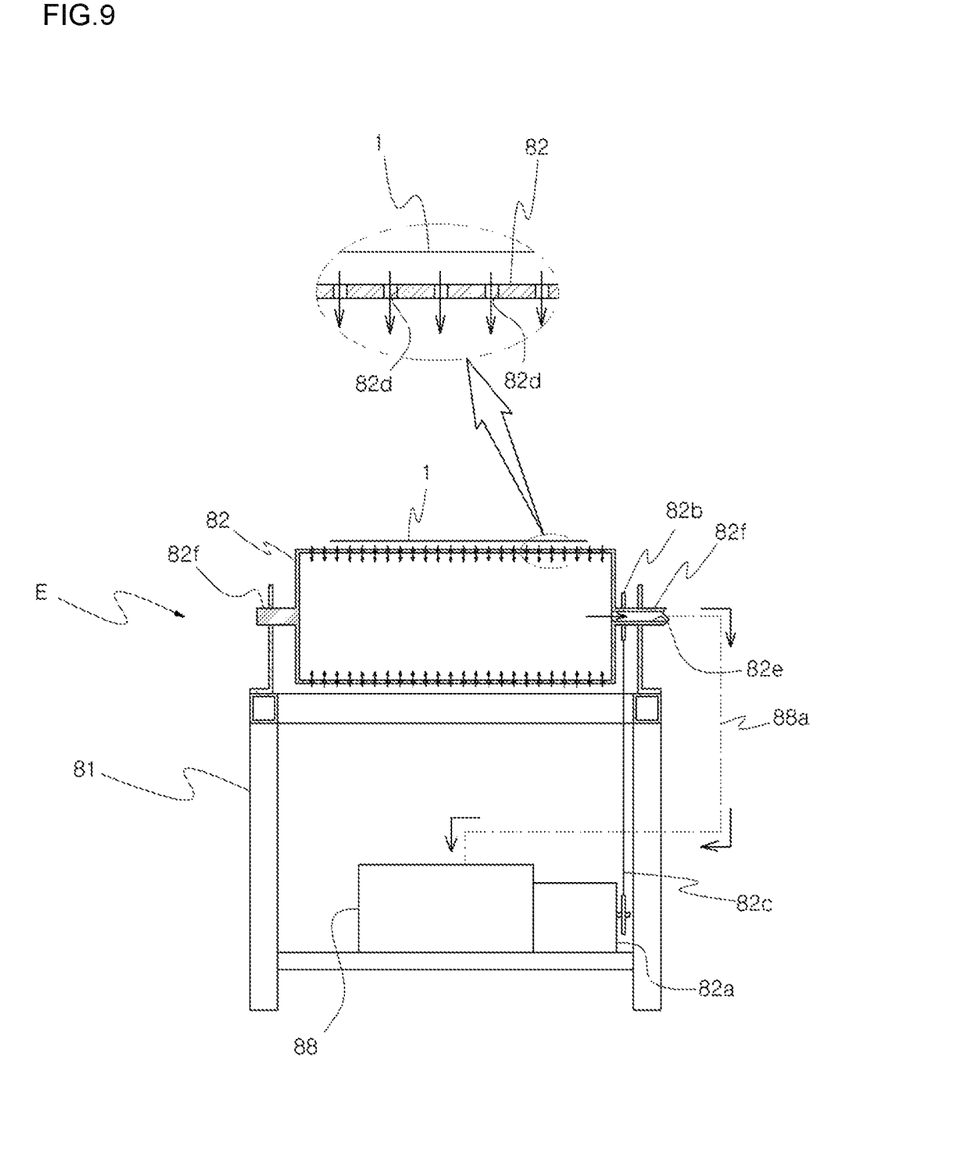
FIG. 9 is a front sectional view taken along the line A-A of FIG. 8.

In this instance, as shown in FIGS. 8 and 9, the transferring roller 82 has a plurality of suction holes 82*d* formed in the circumferential surface thereof and an intake device 88 connected to one side thereof.

For this, the transferring roller 82 includes an exhaust hole 82*e* formed at one side, and the intake device 88 is connected to the exhaust hole 82*e* through a suction pipe 88*a* so as to suck the inside air of the transferring roller 82 and discharge the sucked air to the outside.

In this instance, the exhaust hole 82*e* is formed in the rotary shaft 82*f* of the transferring roller 82.

Therefore, when the inside air of the transferring roller 82 is discharged out using the intake device 88, the outside air is sucked to the inside of the transferring roller 82 through the suction holes 82*d*. After that, when the thin film sheet 1 is put on the upper circumferential side of the transferring roller 82, the thin film sheet 1 is adsorbed onto the circumferential surface of the transferring roller 82 by vacuum pressure generated while the outside air is sucked to the inside of the transferring roller 82 through the suction holes 82*d*.

Furthermore, when the transferring roller 82 is operated by the driving motor 82*a*, the thin film sheet 1 is pulled and transferred to the winder (F) disposed at the rear.

Figure 10:
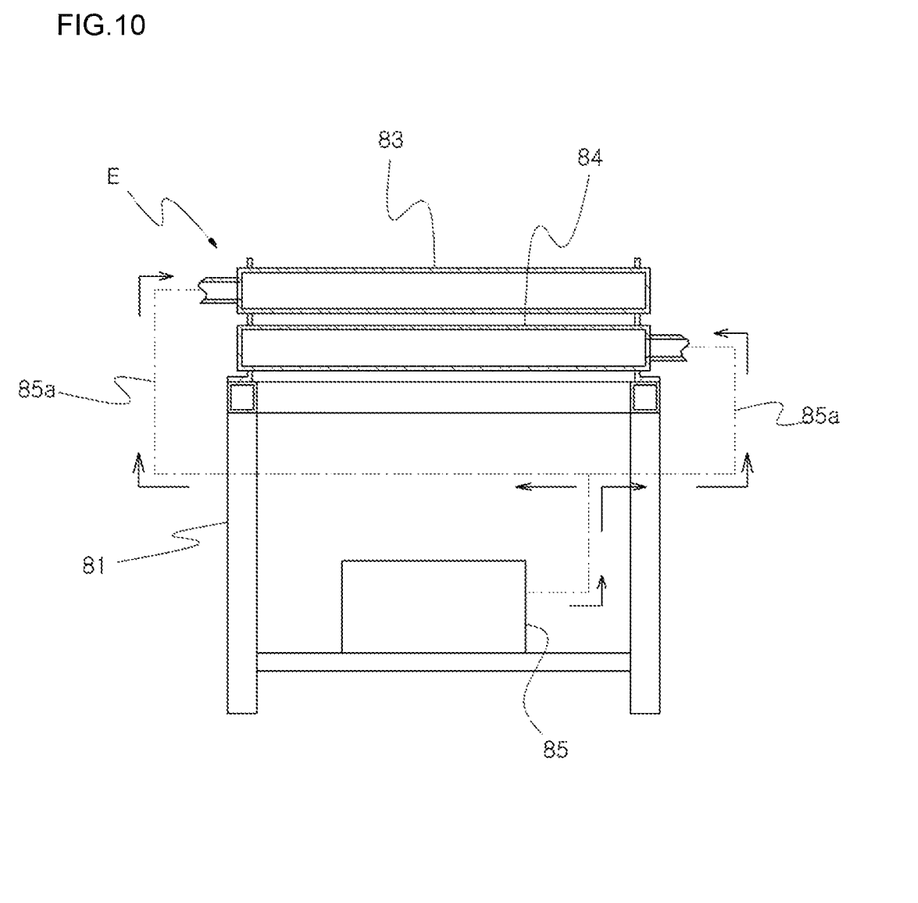
FIG. 10 is a front sectional view taken along the line B-B of FIG. 8.
Figure 11:
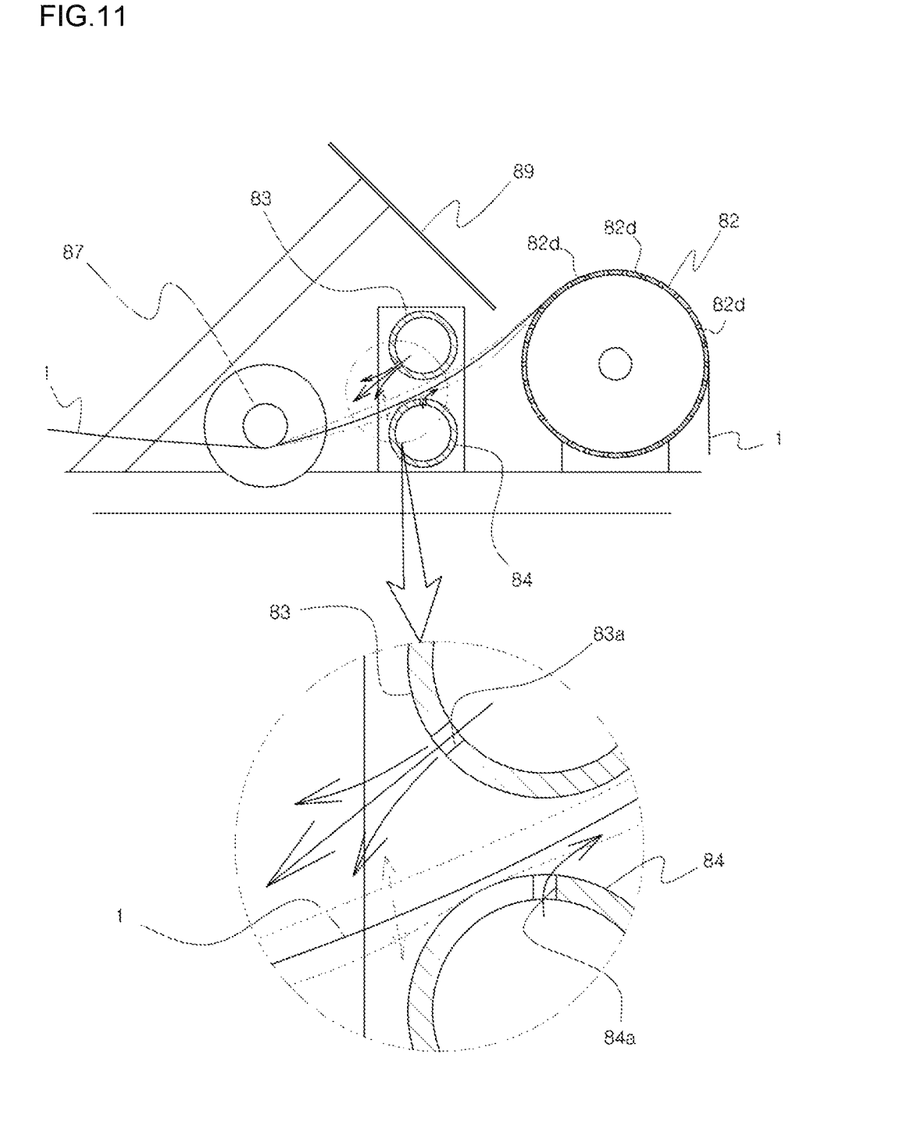
FIG. 11 is a reference view explaining an operation of the dehydrator of the thin film sheet manufacturing apparatus.

As shown in FIGS. 10 and 11, the upper and lower air blowing pipes 83 and 84 are respectively formed in a cylindrical shape extending in the lateral direction and are respectively located on the upper and lower sides of the thin film sheet 1 pulled by the transferring roller 82.

In this instance, the air vent 83*a* of the upper air blowing pipe 83 faces the lower side of the front to blow air toward the upper side of the thin film sheet 1 to be inclined toward the front.

Furthermore, the air vent 84*a* of the lower air blowing pipe 84 is opened toward the upper part to blow air toward the lower side of the thin film sheet 1 in the vertical direction.

The air blower 85 is disposed on the support frame 81 and connected to the sides of the upper and lower air blowing pipes 83 and 84 through an air supply pipe 85a in order to supply air of high pressure to the upper and lower air blowing pipes 83 and 84.

As shown in FIG. 8, the support rollers 86 and 87 are disposed on the support frame 81 to be freely rotated while being separated from each other back and forth at a predetermined interval, and includes: a plurality of front support rollers 86 which support the lower side of the thin film sheet 1; and a plurality of rear support rollers 87 located at the rear of the front support rollers 86 to support the upper side of the thin film sheet 1.

Therefore, the thin film sheet 1 is arranged in such a way as to pass the upper side of the front support rollers 86 and the lower side of the rear support rollers 87, pass between the upper and lower air blowing pipes 83 and 84 and pass the upper side of the transferring roller 82. When the intake device 88 and the air blower 85 are operated while the transferring roller 82 is operated, the thin film sheet 1 passes between the upper and lower air blowing pipes 83 and 84 while being pulled backwardly by the transferring roller 82. After that, as illustrated by the dotted line of FIG. 11, by the air of high pressure discharged from the air vents 83a and 84a of the upper and lower air blowing pipes 83 and 84, the thin film sheet 1 vibrates back and forth to remove moisture stained on the upper and lower sides and is transferred to the winder (F).

In this instance, an anti-spattering plate 89 upwardly extending to be inclined toward the front is disposed at the rear side of the upper air blowing pipe 83 in order to prevent that moisture spattering out from the thin film sheet 1 spatters and is stained on the thin film sheet 1 passing the dehydrator (E) again when moisture stained on the thin film sheet 1 is removed by the upper and lower air blowing pipes 83 and 84.

As shown in FIG. 8, the winder (F) is disposed above the rear side of the support frame 81, and includes: a side plate 91 disposed on the upper side of the support frame 81; a winding drum 92 which is rotatably joined to the side plate 91 to wind the thin film sheet 1 on the circumferential surface by being driven by the driving motor 92a; and a hot air drier 93 which is located below the winding drum 92 to blow hot air toward the lower side of the thin film sheet 1 passing the dehydrator (E).

The hot air drier 93 has a heater disposed inside the air blowing pipe mounted in the air blower.

Therefore, in a state where the thin film sheet 1 is fixed to the winding drum 92, when the driving motor 92a and the hot air drier 93 are operated, the thin film sheet 1 passing the dehydrator (E) is wound on the winding drum 92, and in this instance, moisture remaining on the thin film sheet 1 is additionally removed by air of high temperature discharged from the hot air drier 93.

As described above, the thin film sheet manufacturing apparatus cools the thin film sheet 1 extruded by the extruder (A) using the cooling water tank (C) and winds the thin film sheet 1 using the winder (F) after dehydrating using the dehydration tank (D) and the dehydrator (E), thereby manufacturing the thin film sheet 1 using the rubber material.

In this instance, the dehydrator (E) includes: a support frame 81 extending back and forth; a transferring roller 82 which is disposed on the support frame 81 and driven by a driving motor 82a to transfer the thin film sheet 1; upper and lower air blowing pipes 83 and 84 which are disposed in front of the transferring roller 82 to be located at the upper and lower sides of the thin film sheet 1 and have air vents 83a and 84a formed in the circumferential surface and opened toward the thin film sheet 1; an air blower 85 connected to the upper and lower air blowing pipes 83 and 84 to supply air of high pressure to the upper and lower air blowing pipes 83 and 84; and a plurality of support rollers 86 and 87 which are disposed in front of the upper and lower air blowing pipes 83 and 84 for supporting the thin film sheet 1 to be supplied between the upper and lower air blowing pipes 83 and 84, thereby effectively removing moisture stained on the upper and lower sides of the thin film sheet 1 by spraying air of high pressure to the upper and lower sides of the thin film sheet 1 transferred to the rear by the transferring roller 82 in a state where the thin film sheet 1 is supported by the support rollers 86 and 87.

Particularly, the air vent 83a of the upper air blowing pipe 83 faces the lower side of the front and the air vent 84a of the lower air blowing pipe 84 faces the upper part, such that the air discharged from the upper air blowing pipe 83 is inclinedly sprayed toward the front of the upper side of the thin film sheet 1 and the air discharged from the lower air blowing pipe 84 is vertically sprayed toward the lower side of the thin film sheet 1.

Therefore, the airs sprayed from the air vents 83a and 84a of the upper and lower air blowing pipes 83 and 84 are sprayed in the direction that they cross each other so that the thin film sheet 1 is vibrated in the vertical direction, thereby more effectively removing moisture stained on the upper and lower sides of the thin film sheet 1.

Furthermore, the transferring roller 82 is formed in the cylindrical shape having the inner space part and includes the suction holes 82d formed in the circumferential surface thereof and the intake device 88 is connected to the transferring roller 82, such that the thin film sheet 1 is adsorbed onto the circumferential surface of the transferring roller 82 by vacuum pressure generated when the inside air of the transferring roller 82 is discharged by the intake device 88. Therefore, the thin film sheet manufacturing apparatus according to the preferred embodiment of the present invention can effectively prevent that the thin film sheet 1 slips from the circumferential surface of the transferring roller 82.

That is, because the thin film sheet 1 on which moisture is stained is put on the upper side of the driving roller 61, the thin film sheet 1 is adhered to the driving roller 61 by moisture, and hence, the thin film sheet 1 does not slip from the circumferential surface of the driving roller 61 when the driving roller 61 is operated.

On the contrary, the thin film sheet 1 from which moisture is removed while the thin film sheet 1 passes the dehydrator (E) is put on the circumferential surface of the transferring roller 82. In this instance, in a case that the thin film sheet 1 is simply put on the circumferential surface of the transferring roller 82, there occurs a slip between the transferring roller 82 and the thin film sheet 1 when the transferring roller 82 is operated, and hence, the thin film sheet 1 is not pulled to the rear.

However, according to the present invention, because the transferring roller has the suction holes 82d and the intake device 88 is connected to the transferring roller 82, the thin film sheet 1 gets in close contact with the circumferential surface of the transferring roller 82 by vacuum pressure, thereby preventing that there is a slip between the transferring roller 82 and the thin film sheet 1 when the transferring roller 82 is operated and effectively pulling and transferring the thin film sheet 1 to the rear using the transferring roller 82.

Additionally, the anti-spattering plate 89 upwardly extending to be inclined toward the front is disposed at the rear side of the upper air blowing pipe 83 in order to effectively prevent that moisture spatters and is stained on the thin film sheet 1 passing the dehydrator (E) again when moisture stained on the thin film sheet 1 is removed by the dehydrator (E).

Moreover, the hot air drier 93 for blowing hot air to the lower side of the thin film sheet 1 passing the dehydrator (E) is disposed on the winder (F) in order to heat the thin film sheet 1 from which moisture is first removed while passing the dehydrator (E).

Therefore, the thin film sheet manufacturing apparatus according to the preferred embodiment of the present invention perfectly remove moisture remaining on the thin film sheet 1, thereby effectively preventing the thin film sheet 1 on which moisture stained from being adhered onto the winder (F) or from being discolored or damaged by moisture.

Furthermore, the thickness adjusting unit (B) for adjusting the thickness of the thin film sheet 1 extruded by the extruder (A) is disposed between the extruder (A) and the cooling water tank (C) in order to readjust the thickness of the thin film sheet 1 extruded in the extruder (A), such that the thin film sheet 1 can be manufactured very thin to be less than 0.4 mm in thickness.

That is, in the case that the thin film sheet 1 is manufactured through the steps of extruding rubber using the extruder (A) and discharging the extruded rubber through the molding hole 14*a* of the mold 14, the thickness of the thin film sheet 1 discharged through the molding hole 14*a* becomes irregular and thicker than the width of the molding hole 14*a* by elasticity of the rubber material.

Therefore, when the thin film sheet 1 manufactured by the extruder (A) is readjusted in thickness using the thickness adjusting unit (B), the thin film sheet 1 can be very thin and have an accurate thickness.

In this embodiment, it is exemplified that the thin film sheet 1 dried after passing the dehydrator (E) is simply wound by the winder (F), but the winder (F) may further include a supply roll on which a tape which is combined with the thin film sheet 1 is wound in such a way that the tape released from the supply roll is combined with the thin film sheet 1 and the thin film sheet 1 of which one side is combined with the tape is wound on the winder (F).

Additionally, it is illustrated in the drawings that the cooling means 38 includes the water supply pipe 38*a* connected to the inner support pipe 33*a* by the rotary coupler and the drain pipe 38*b* connected to the outer support pipe 33*b* by the rotary coupler, but the cooling means 38 may be changed to have one of various structures, for instance, may be constructed in such a way as to be connected to the press rollers 31 and 32 to lower temperature of cooling water using a radiator or a cooling cycle while circulating the cooling water.

In addition, it is illustrated that the thin film sheet manufacturing apparatus according to the present invention manufactures the thin film sheet 1 using rubber, but may manufacture the thin film sheet 1 using various materials, such as silicon.

What is claimed is:

1. A thin film sheet manufacturing apparatus comprising:
    an extruder (A) for extruding rubber or synthetic resin to mold a thin film sheet (1) of a strip type;
    a cooling water tank (C) of a box form of which upper side is opened, the cooling water tank (C) storing cooling water therein to water-cool the thin film sheet (1) extruded in the extruder (A);
    a dehydration tank (D) of a barrel shape of which upper side is opened, the dehydration tank (D) having a punched plate (71), which is arranged inside the dehydration tank (D) and has a plurality of drain holes (71*a*) perforating the upper and lower sides thereof in order to remove moisture stained on the thin film sheet (1) passed the cooling water tank (C);
    a dehydrator (E) for second removing the moisture stained on the thin film sheet (1) passing the dehydration tank (D); and
    a winder (F) for winding the thin film sheet (1) passing the dehydrator (E),
    wherein the dehydrator (E) includes:
    a support frame (81) extending back and forth;
    a transferring roller (82) which is disposed on the support frame (81) and driven by a driving motor (82*a*) to transfer the thin film sheet (1);
    upper and lower air blowing pipes (83, 84) which are disposed in front of the transferring roller (82) to be located at the upper and lower sides of the thin film sheet (1) and have air vents (83*a*, 84*a*) formed in the circumferential surface and opened toward the thin film sheet (1);
    an air blower (85) connected to the upper and lower air blowing pipes (83, 84) to supply air of high pressure to the upper and lower air blowing pipes (83, 84); and
    a plurality of support rollers (86, 87) which are disposed in front of the upper and lower air blowing pipes (83, 84) for supporting the thin film sheet (1) to be supplied between the upper and lower air blowing pipes (83, 84).

2. The thin film sheet manufacturing apparatus according to claim 1, wherein an air vent (83*a*) of the upper air blowing pipe (83) faces the lower side of the front and an air vent (84*a*) of the lower air blowing pipe (84) faces the upper side.

3. The thin film sheet manufacturing apparatus according to claim 1, wherein the transferring roller (82) is formed in a cylindrical shape having an inner space part and includes a plurality of suction holes (82*d*) formed in the circumferential surface thereof, and an intake device (88) connected to one side of the transferring roller (82), such that the thin film sheet (1) is adsorbed onto the circumferential surface of the transferring roller (82) by vacuum pressure generated when the inside air of the transferring roller (82) is discharged by the intake device (88).

4. The thin film sheet manufacturing apparatus according to claim 1, further comprising:
    an anti-spattering plate (89) upwardly extending to be inclined from the rear side of the upper air blowing pipe (83) toward the front.

5. The thin film sheet manufacturing apparatus according to claim 1, further comprising:
    a hot air drier (93) which is disposed to face the front to blow hot air toward the lower side of the thin film sheet (1) passing the dehydrator (E).

6. The thin film sheet manufacturing apparatus according to claim 1, further comprising:
    a thickness adjusting unit (B) disposed between the extruder (A) and the cooling water tank (C) to adjust a thickness of the thin film sheet (1) extruded in the extruder (A),
    wherein the thickness adjusting unit (B) includes:
    a support frame (20);
    a pair of press rollers (31, 32) which are disposed on the support frame (20) to get in contact with the front and rear sides of the thin film sheet (1) extruded from the extruder (A) and are operated by a driving motor (36); an interval adjusting unit (40) which is connected to the press rollers (31, 32) to adjust an interval between the press rollers (31, 32); and an interval measuring unit (50) for specifying the interval between the press rollers (31, 32),
    wherein each of the press rollers (31, 32) is formed in a cylindrical shape having an inner space part, and wherein cooling means (38) is connected to the press rollers (31, 32) to cool the press rollers (31, 32) by circulating cooling water to the inside of the press rollers (31, 32).

\* \* \* \* \*